United States Patent [19]

Hills et al.

[11] Patent Number: 5,484,988
[45] Date of Patent: Jan. 16, 1996

[54] CHECKWRITING POINT OF SALE SYSTEM

[75] Inventors: Robert R. Hills, St. Augustine, Fla.; Henry R. Nichols, McLean, Va.

[73] Assignee: Resource Technology Services, Inc., Vienna, Va.

[21] Appl. No.: 257,390

[22] Filed: Jun. 9, 1994

Related U.S. Application Data

[63] Continuation of Ser. No. 975,717, Nov. 13, 1992, abandoned.

[51] Int. Cl.⁶ ........................ G06F 15/30
[52] U.S. Cl. ........................ 235/379; 235/380
[58] Field of Search ........................ 235/379, 380

[56] References Cited

U.S. PATENT DOCUMENTS

| | | | |
|---|---|---|---|
| 3,824,544 | 7/1974 | Simjian | 340/147 A |
| 3,845,470 | 10/1974 | Schuller | 340/149 A |
| 4,270,042 | 5/1981 | Case | 235/379 |
| 4,404,649 | 9/1983 | Nunley et al. | 364/900 |
| 4,523,330 | 6/1985 | Cain | 382/7 |
| 4,580,040 | 4/1986 | Granzow et al. | 235/379 |
| 4,617,457 | 10/1986 | Granzow et al. | 235/379 |
| 4,672,377 | 6/1987 | Murphy et al. | 340/825.34 |
| 4,673,802 | 6/1987 | Ohmae et al. | 235/379 |
| 4,678,895 | 7/1987 | Tateisi et al. | 235/379 |
| 4,678,896 | 7/1987 | Carlson et al. | 235/380 |
| 4,743,743 | 5/1988 | Fukatsu | 235/379 |
| 4,810,866 | 3/1989 | Lord, Jr. | 235/379 |
| 4,823,264 | 4/1989 | Deming | 235/379 |
| 4,933,536 | 6/1990 | Lindemann et al. | 235/375 |
| 4,934,772 | 6/1990 | Sakuma et al. | 350/6.5 |
| 5,053,607 | 10/1991 | Carlson et al. | 235/379 |

*Primary Examiner*—Harold Pitts
*Attorney, Agent, or Firm*—Thomas M. Champagne; Jon L. Roberts; Roberts & Associates

[57] ABSTRACT

A point of sale system designed to read information from a consumer's check, credit card, or manual input with a subsequent debiting of a consumer's account and crediting a merchant's account for the goods or services provided. Point of sale terminals are designed to accept a form of credit card with a consumer's bank account information encoded thereon or in the alternative to read the MICR number from a consumer's check in order to verify that a consumer has an appropriate balance to conduct the transaction with a given merchant. Thereafter the transaction of that information is transmitted to a central computer system which verifies the consumer's credit worthiness and stores the transaction event information for subsequent bank reconciliation via the ACH network. The invention eliminates the need for paper checks with all bank reconciliation being accomplished electronically.

20 Claims, 8 Drawing Sheets

Merchant Name
Street Address
City, ST  Zip
Merchant Acct #

TIME 00:00 _M                               DATE 00/00/00
BANK ACCT. NO. 000000000000
TRANSIT NO. 000000000

SALE AMOUNT                                 $ 0,000.00

TERMINAL ID 0000000000

I herewith authorize ChequeMARK Systems to electronically access my designated checking account for the payment of the above referenced purchase.

Name (PRINT) _____

Street _____

City _____ ST _____ Zip _____

Tel. Number: (_____) _____ — _____

I ACKNOWLEDGE THAT RETURN FEES WILL BE IMPOSED SHOULD MY PAYMENT BE DISHONORED AND UNDERSTAND THAT IT IS UNLAWFUL TO AUTHORIZE PAYMENTS FOR WHICH ADEQUATE MONIES ARE NOT AVAILABLE WITHIN MY ACCOUNT.

X_____
    Authorizing Signature

*FIG. 8*

Merchant Name
Street Address
City, ST Zip
Merchant Acct #

CUSTOMER BANKING INFORMATION:

BANK ACCT. NO. _____

TRANSIT NO. _____

SALE AMOUNT . . . . . . . . . . . . . . . . . . . . $ _____

I herewith authorize ChequeMARK Systems to electronically access my designated checking account for the payment of the above referenced purchase amount. I acknowledge that sufficient funds are available for the payment of this sale.

Name (PRINT) _____

Street _____

City _____ ST_____ Zip _____

Tel. Number: (_____) _____ — _____

I FURTHER ACKNOWLEDGE THAT RETURN FEES WILL BE IMPOSED SHOULD MY PAYMENT BE DISHONORED AND UNDERSTAND THAT IT IS UNLAWFUL TO AUTHORIZE PAYMENTS FOR WHICH ADEQUATE MONIES ARE NOT AVAILABLE WITHIN MY ACCOUNT.

X_____
                 Authorizing Signature

*FIG. 9*

CHECKWRITING POINT OF SALE SYSTEM

RELATED APPLICATION

This application is a continuation of Ser. No. 07/975,717 filed Nov. 13, 1992, now abandoned.

FIELD OF THE INVENTION

This invention relates to the field of Point-of-Sale systems and more particularly to the integration and processing of purchases whereby a check is used as the basic source of identification of the individual and of the individual's bank and whereby the bank account is debited.

Background Art

Numerous devices exist for processing checks. For example, U.S. Pat. No. 4,933,536 to Lindemann, et al., describes a check processing device which is used together with a Point-of-Sale terminal. This particular device involves copying and taking a picture of an individual whereby a dishonored check could then be traced to the person who has offered it.

U.S. Pat. No. 4,810,866 to Lloyd, Jr., describes a check validation system again located together with a Point-of-Sale system for imprinting and otherwise physically dealing with a check.

Other systems also deal an apparatus for handling checks at a point of sale. For example, U.S. Pat. No. 4,743,743 to Fukatsu describes one such transaction apparatus where a check is examined by a reader. U.S. Pat. No. 4,672,377 to Murphy, et al. describes a check authorization system wherein a check is imprinted with a bar code and information concerning customers which are stored in a database. U.S. Pat. No. 3,845,470 to Schuller discloses a vending system using a modified form of a check which is imprinted with identification codes, when someone attempts to use the check in purchasing goods and services, a vending operation will not place the order if information associated with the check is not valid in a particular database.

Other check-based financial systems have also been the subject of invention. U.S. Pat. No. 4,617,457 addresses an ATM or automatic teller machine form of cashing checks. Such systems create a picture of the check involved and also involves checking against a specialized database to insure that the check is a "valid" one (see also U.S. Pat. No. 4,580,040 to Granzow et al.).

Another generic category of financial systems deals with methods of handling the financial transactions apart from the physical handling of the check itself. For example, U.S. Pat. No. 3,824,544 to Simjian describes a merchant issued "check" which can be used in the purchase of goods and services and upon purchase, a specialized code is evaluated to determine if the check is being validly utilized.

U.S. Pat. No. 4,404,649 to Nunley et al. describes a document processing system which generally discloses a method of reading checks for processing a wide variety of financial documents.

U.S. Pat. No. 4,523,330 to Caine also describes a method for processing financial documents which systems also includes a Point-of-Sale terminal for generating image data from checks as they are being processed. This patent is drawn principally to the actual terminal itself.

U.S. Pat. No. 4,673,802 to Ohmae et al. describes a central processing system having stored data relating to the accounts of users. Users are approved or disapproved at the Point-of-Sale based upon information in the database.

U.S. Patent No. 4,270,042 to Case discloses a point of sale system that requires a consumer to prepay a sum of money into a special account that is accessed only by the system. This amount is inscribed on the card, and when a transaction is made using the system, the amount of the transaction is punched out of a designated area on the card. This amount, along with a signature and other information, is supplied on a draft negotiable instrument, which is given to the merchant at the time of the transaction. Thus, the Case system does away with the use of bank checks in effecting the transacion, but requires the use of specialized prepaid draft negotiable instruments that must be surrendered to the merchant.

U.S. Patent No. 4,823,264 to Deming discloses a home banking system that can be used to transfer funds to different payees in satisfaction of debts incurred through previous purchases, use of utilities, etc. The system is consumer driven; that is, it is contemplated for use by the payor on a home personal computer. While the Deming system does away with the use of bank checks, account and other information must be keyed into the system. The Deming system cannot be used to read account and other information directly from an ordinary bank check and has no use for bank checks as instruments other than negotiable paper. Further, the Deming system cannot be used to transfer funds at the time of purchase and is not workable at the point of sale; the system can only be used to pay debts that have been incurred in the past and have accumulated.

Finally, U.S. Pat. No. 4,678,896 to Carlson et al. describes a Point-of-Sale system whereby an apparatus is provided to secure the processing and imprinting of checks.

All of these above patents deal with the specific problem of how to accept a check from a customer for the purchase of goods and services. They do not in any way address the subsequent processing of checks nor do they address the process by which checks are cleared through the normal automatic check handling clearinghouse operations that exist in the financial world. Thus, the interaction of these systems with the automated clearing house ("ACH") process is not addressed in any way. This is particularly important since if any Point-of-Sale check handling system is to interact with the ACH mechanism it must adhere to that processing scheme and must lend itself to use with a processing scheme.

Further, some of the currently used systems described above require the use of a bank check as a negotiable instrument which must be surrendered to a merchant. Some of the systems do away with the use of a bank check altogether, but require a debit card or a specialized draft instrument to be used only with the particular system. None of these systems completely does away with the need and use for a negotiable draft instrument while using the consumer's bank check for identification and verification only. It is therefore an objective of the present invention to provide such a system.

It is an objective of the present invention to be adaptable for use with the ACH system and to be smoothly incorporated into it. In this fashion, the present invention will immediately be useful for a much wider range of financial transactions above and beyond those contemplated and disclosed in the background references discussed above.

Summary of the Invention

The present invention comprises a process and apparatus which may be employed for the purpose of effecting payments for point-of-sale purchases of goods and services paid from consumer funds secured in bank checking or depository accounts. Each sale or "Transaction Event" would be an electronic and "paperless" event thereby eliminating reliance on accepting and processing commercial bank drafts (personal or corporate checks) and the physical handling of those bank drafts thus replacing commercial bank drafts at the point-of-sale.

In contrast to known systems, the present invention is a merchant driven system that can be used to process a transaction at the point of sale and at the time of purchase. The system is intended to be made available to subscribing merchants, businesses, and individuals herein referred to as "system subscribers" wishing to employ the method and apparatus of the present invention for the electronic processing and settlement of consumer purchases. Further, operational parameters of the present invention allow freedom from customary state or other geographically limiting criteria typical when accepting and processing "paper" checks. The system is designed to act with the national authorization and electronic settlement network known as the ACH system.

The system is designed to perform in a fully automated manner enabling each Transaction Event to be processed by a system subscriber as a point-of-sale transaction in the presence of the consumer. When the transaction event is "approved" funds are debited from an authorized consumer account for credit to the system subscriber and electronic settlement by ACH deposits the transaction amount to the subscriber's designated depository account. Authorized access to consumer accounts and credits to system subscriber depository accounts are performed as "Off-Line" transactions by means of Electronic Funds Transfer ("EFT") through the ACH Network or through the Federal Reserve System.

The invention comprises a point-of-sale processing system comprising electronic data processing equipment which allows individual services selections which provide automated, electronic processing from bank checking or depository accounts. It is the objective of the present invention to automate the point-of-sale environment for processing consumer purchases of goods and services which, other than for the system of the present invention, would necessitate the more traditional acceptance and processing of commercial bank drafts (personal and/or corporate checks). Individual Transaction Events are administered under the system of the present invention by initiating a terminal authorization inquiry and continuing through the electronic settlement of funds representing the Transaction Event from the preapproved consumer banking accounts.

It is a further objective of the present invention to eliminate the need for "paper" checks as an accepted means of consumer payment. In the place of personal and business checks, consumers would be provided free and unrestricted access to funds secured in bank accounts of various types by means of preauthorized electronic events. System subscribers electronically communicate with the data center of the present invention for individual Transaction Event authorizations which, upon reconciliation of a day's activity, result in an EFT by means of the Automated Clearing House accommodating an "Off-Line" debiting of preauthorized consumer Transaction Events from authorized accounts. Thereafter, each system subscriber is credited with the total of all such daily authorized Transaction Events to its designated banking depository account.

The present invention comprises logic which allows the following services which when individually performed or where combined with other services establish a wholly unique processing medium enabling preauthorized access to consumers' checking account or bank depository reserves.

Authorization—This service supports electronic communication from point-of-sale to the system's central computer. The data center stores positive and negative files concerning consumer accounts thereby providing accurate inquiry responses regarding the current posting status of a consumer's banking account and signaling the system subscriber that said account may be reasonably relied upon for consummating a Transaction Event (i.e., an "Approval") or, where listed as delinquent, indicating that the account may not be so relied upon (i.e., a "Denial").

Check Replacement—This capability operates as an extension of Authorization enabling the system subscriber the capability of completing a Transaction Event by electronically logging the sale whereupon a Transaction Event Slip will be printed or manually prepared for consumer execution at the point-of-sale. By execution of the Transaction Event Slip, the consumer authorizes the electronic accessing of funds secured in his/her authorized banking account in lieu of the more traditional method of issuing personal and business checks. Funding settlement to the system subscriber would be effectuated by means of Electronic Funds Transfer via ACH or the Federal Reserve System as opposed to physically processing and transferring checks among banks.

Bank Transaction Card—As part of this invention on "Off-Line" Debit Card is established on which is stored the information relating to the banking account from which funds representing the Transaction Event would be debited for payment to the system subscriber. This information may be stored on the card itself in encrypted or unencrypted form or may be stored in the central computer where access to such information is gained via special control characters or access codes stored on the card. Electronic authorization for withdrawal of funds from the cardholder's account and subsequent electronic settlement procedures remain essentially identical to processing under the Check Replacement service described above. Information relating to the consumer-cardholder and the appropriate banking account to be debited for a Transaction Event will be encoded upon the magnetic stripe portion of the plastic, and terminal-readable, card.

Thus, the overall objective of the present invention is to provide and support an alternate means for consumer payments for goods and services that operates to replace commercial bank drafts in the point-of-sale environment. Simultaneously, the present invention assures consumers greater access to and use of funds in personal or corporate banking accounts. Further, the system provides system subscribers a significantly improved prospect of collecting the underlying monies for Transaction Events, reduced time for the collecting the cash receipts from Transaction Events, and a pronounced lowering of the present cost of cumbersome procedures otherwise mandated by the existing ACH system for accepting and processing commercial bank drafts.

A further objective of the present invention is to significantly reduce the use of checks as negotiable instruments in effecting the purchases of goods or services and to further reduce the consumers reliance on credit cards or cash for transaction events.

Detailed Description of the Preferred Embodiment

The method of the present invention begins with the electronic recording of consumer information at a system subscriber's location using a point-of-sale terminal. This information is obtained in the presence of the consumer and occurs prior to any "Approval" either for the Transaction Event or for the ultimate crediting of the System subscriber's designated depository account. A Transaction Event involves a series of events initiated by a system subscriber's request to sell goods or services by payment from funds secured in a consumer's banking account. First, the consumer's banking account status will be verified through accessing the central computer files of the present invention. Verification that an account may be accessed is established alternatively by means of an encoded, magnetic strip card, or by input of account identification numbers from a consumer's bank account. A more traditional identification of the consumer could also occur including visual examination of driver's license or similar and acceptable picture "ID" however this is not considered part of the present invention.

As an integral portion of each Transaction Event, the system subscriber's location, date and time, and requested sale amount is automatically logged into the system when a system subscriber first accesses the invention. Finally, a Transaction Event Slip ("Sales Slip") will be produced by a printer integral to the point-of-sale terminal and will be executed by the consumer in the amount of the stated purchase with inscribed language defining the Transaction Event and specifically providing consumer authorization for electronic access to his/her banking account. Thereafter, the consumer account will be debited and the proceeds credited to the system subscriber's designated depository account along with all other similar Transaction Events representing the total of the system subscriber's daily activity. Debiting of consumer accounts and settlement deposits to each system subscriber is performed by means of Off-Line electronic funds transfer through and by the ACH or Federal Reserve System.

Equipment Configuration—The present invention can operate with nearly every conceivable point-of-sale equipment system. The central computer system accepts data transmitted from the system subscriber's existing point-of-sale equipment or that which is added to augment service performance. The point of sale terminal of the present invention is implemented in a number of ways, most preferred, however, being activation under a fully automated format. Such a fully automated system generally comprises a dual-port terminal with magnetic stripe reading capabilities interfaced with a logging printer capable of providing individual Transaction Event Slips for consumer execution, and a MICR check reader, optical character recognition ("OCR") equipment, or other device. Variations to this configuration are particularly possible where the system of the present invention is to be activated under a "Split-Dial" feature installed to function within the operational parameters of existing point-of-sale equipment primarily dedicated to bankcard ("credit card") processing. It is contemplated that services may in the future be administered using the present invention with a singular point-of-sale hardware device which, as a function of its design, would incorporate all or most of the service capabilities of an integrated terminal, logging printer, and MICR Check Reading device. The system of the present invention can alternately be interfaced with electronic cash registers now on the market.

Communications links from point-of-sale terminals to the central computer of the present invention will typically be in the form of telephonic network communications over a public switched telephone network ("PSTN") or over other approved networks. Transaction Event verification will occur as a result of point-of-sale terminal access to the central computer's positive and/or negative data files. "Approved" or "Declined" notifications are made to the Point-of-Sale device over the PSTN. All data files will be centrally located and maintained on the invention's central computer data bases. Portions of the data base include but are not limited to third party data files such as the Shared Check Authorization Network ("SCAN") (trademark) data base.

Individual transactions or groupings of transactions are first approved by soliciting an "Authorization" prior to the completion of any requests for electronic funds transfer. To maintain an accurate status of file information for authorizations to subscribing merchants, businesses, and/or individuals, separate data bases are maintained. Current cardholder or banking account status are updated daily and instantly available for point-of-sale inquiry for Transaction Event authorizations. updated daily and are instantly available for point-of-sale inquiry for Transaction Event authorizations.

System subscribers point-of-sale equipment is interfaced to the central computer of the present invention by means of a telephonic network which is able to support communication from a plurality of point-of-sale terminals. Programming of the point-of-sale terminal causes an automatic "Dial-Up" to the central computer and provides an automatic query and response sequence affirming or denying the Transaction Event. The addition of local entry hubs may be installed to better facilitate the speed or economics of communications with the data files. Alternatives to telephonic networks may involve use of satellite communications or enhanced radio transmissions. Similarly, the system's data files and associated Check Replacement Service are contemplated to be responsive to emerging point-of-sale devices intended to seek authorizations by the alternate means of voice pattern recognition, fingerprint identification, retina scan, "smart" chips, and/or consumer or check image and/or signature broadcasting.

DETAILED DESCRIPTION OF THE PREFERRED EMBODIMENT

Figure 1:
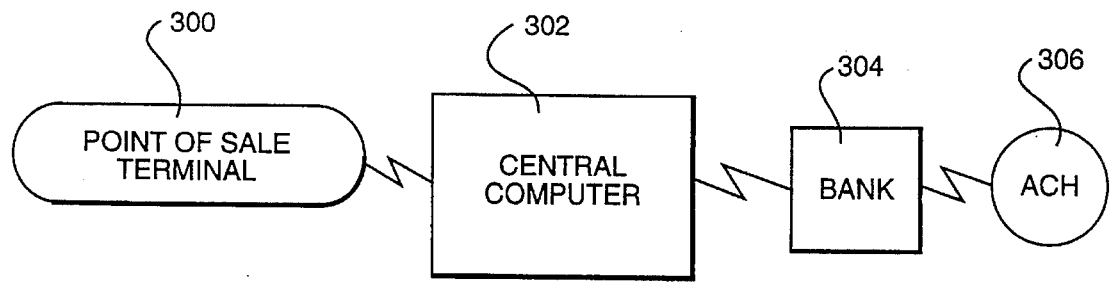
FIG. 1—System overview of the present invention
FIG. 2—The point-of-sale terminal
FIG. 3—The Central Computer System
FIGS. 4–7—The process Data Flow
FIG. 8—Transaction Event Sales Slip
FIG. 9—Manual Transaction Event Sales Slip

Referring to FIG. 1 an overall schematic of the present invention is described. Point-of-sale terminals 300 communicate over normal PSTN telephone lines with a central computer system 302 which in turn communicates with a banking institution 304 for purposes of debiting consumer accounts and crediting system subscriber accounts. The banking institution performs its function via normal automated clearing house ("ACH") transactions 306.

Figure 2:
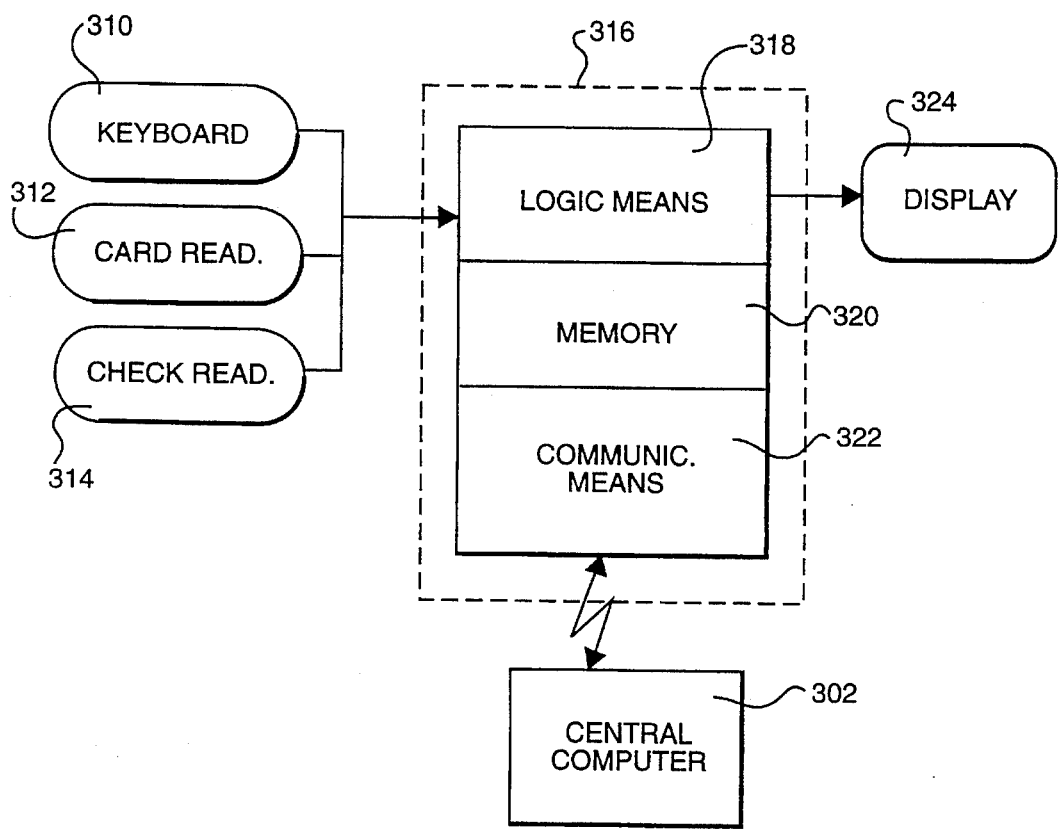

Referring to FIG. 2 the point-of-sale terminal is described. The point-of-sale terminal comprises several different entry means. A key board 310 can be used to input consumer information manually. Alternatively a card reader 312 can be used whereby the magnetic stripe on the card is read by the point-of-sale terminal and finally a check reader 314 is also included to read the MICR number on checks as a substitute for either a specific card or key board input. These various input means provide information to a microprocessor 316 which comprises logic means 318, memory means 320, and communication means 322. The logic means 318 comprises logic which allows the information received from the various input means to be processed and stored in the memory 320. The logic means further drives a display 324 which provides a visual output of the account number of the consumer for verification. The communication means 322 allows the subscriber terminal to communicate with the central computer 302 for purposes of processing the consumer's purchase.

Figure 3:
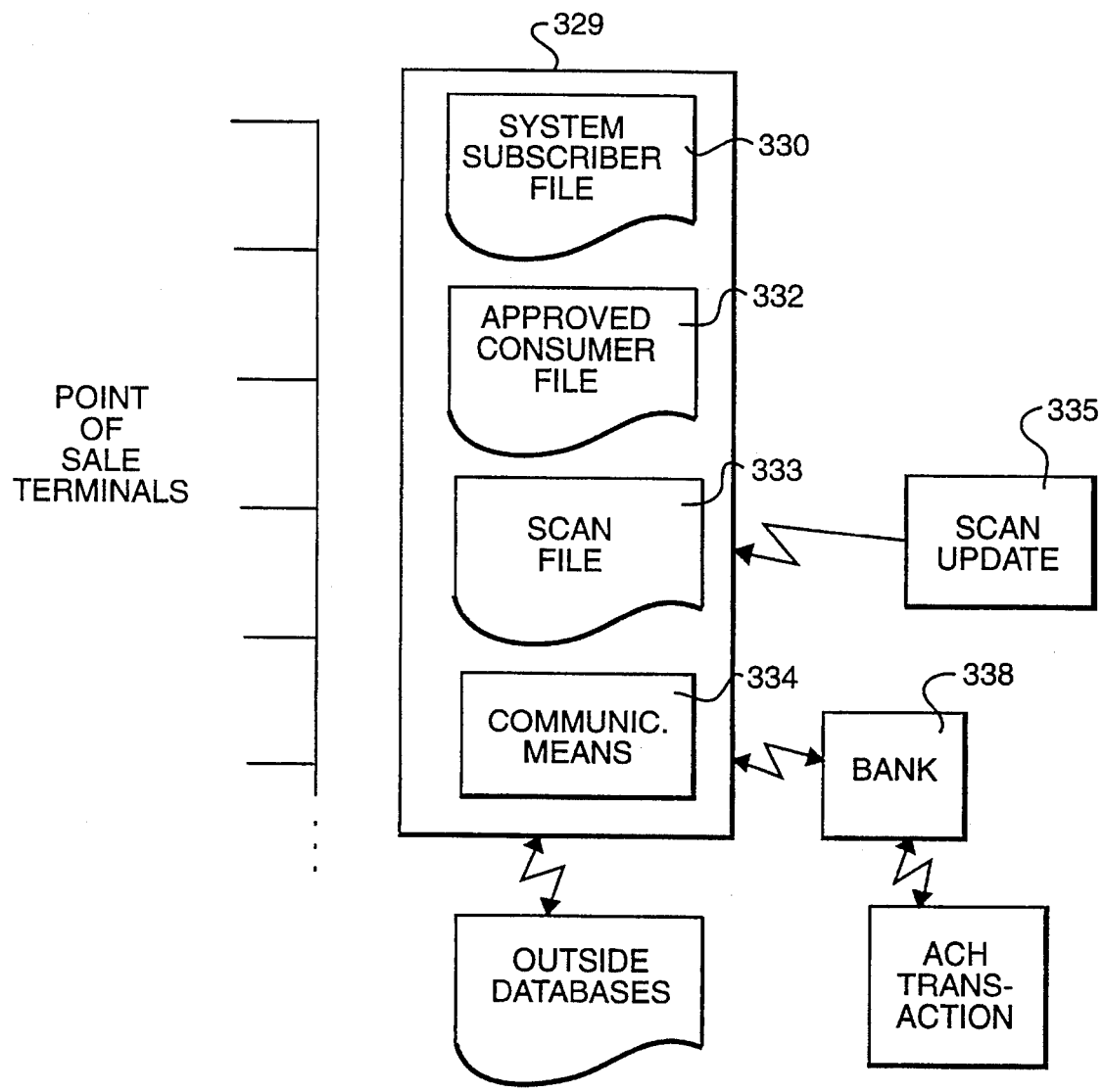

Referring to FIG. 3 the central computer system 329 is described. The central computer system receives input from a plurality of point-of-sale terminals which provide transaction information from a system subscriber and a consumer desiring to purchase goods or services. The central computer system comprises a system subscriber 330 file which is a file of those merchants who have elected to use the present invention for processing purchases. The central system also comprises an approved consumer file 332 which stores the names of those consumers who have already been approved for allowing purchases to take place through the various input means as well as a third party database such as the SCAN (trademark) data base relating to consumer credit. The computer system also comprises a communications means 334. The communication means communicates with other outside third party data bases to allow any consumer that has not been approved by the system to have a rapid check of the status of the consumer's banking account and of whether the consumer has current outstanding returns (i.e. bad checks). Once this SCAN (trademark) or other outside third party data base search is performed and where an approval is given, the approved consumer file 332 is updated with the name of the new approved consumer.

As presently configured the central computer 329 already has a third party database known as the SCAN (trademark) database 333 resident on the central computer. Thus credit worthiness can be checked using this SCAN database. The SCAN (trademark) database is updated daily.

The communication means 334 also communicates with a banking institution 338 to instruct the bank to debit the account of the consumer and credit the account of the system subscriber (merchant) with the amount of the purchase. These transactions then take place via the normal ACH transaction process.

Figure 4:
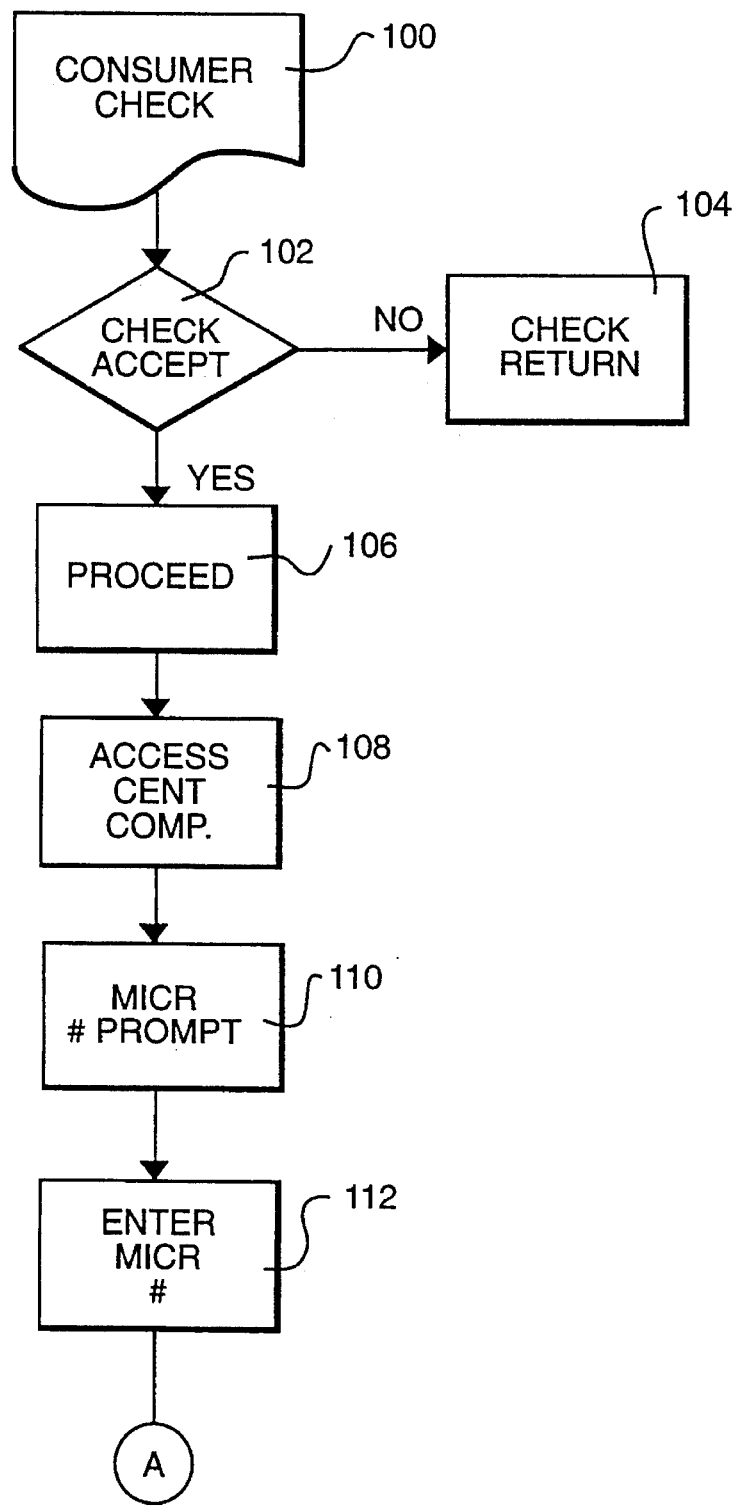

Referring to FIG. 4 the process begins by a consumer presenting a specimen or "blank" check complete with MICR number to the system subscriber (the merchant) 100. The system subscriber next determines if the check meets appropriate store policy procedures 102, i.e., that the check has appropriate information on the check. If the check does not meet the store policies, it is returned to the consumer 104. If the check does meet appropriate store policies the on-line verification process proceeds 106. The subscriber begins the process by first pressing the appropriate key on a terminal to access the host computer 108. Thereafter the point of sale terminal prompts the system subscriber to enter the appropriate MICR number 110. The system subscriber then enters the appropriate MICR number either manually or by passing the check through a check reader which determines the MICR number 112.

Figure 6:
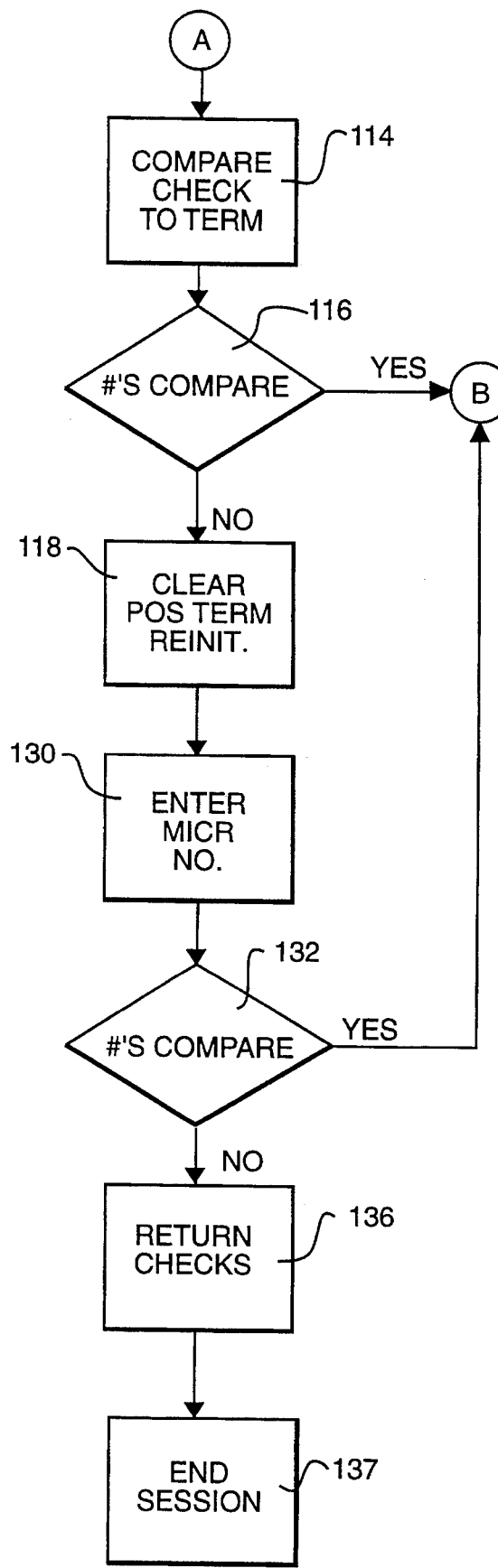

Referring to FIG. 6 the subscriber would verify that the numbers appearing on the terminal match the MICR numbers on the check 114. During the comparison, the subscriber determines that the check number compares accurately 116 to the number displayed on the terminal. If they do compare the verification process proceeds 120. If the check numbers do not compare with that of the terminal the system subscriber clears the terminal and begins the transaction process again 118. If the process is to be reinitiated, the subscriber enters the MICR number into the point of sale terminal 130. Thereafter the system subscriber compares the MICR numbers as before 132. If the MICR numbers compare to the system display 134 the process proceeds. If the numbers do not compare 136 the check is returned to the consumer and the process terminates 137.

Figure 5:
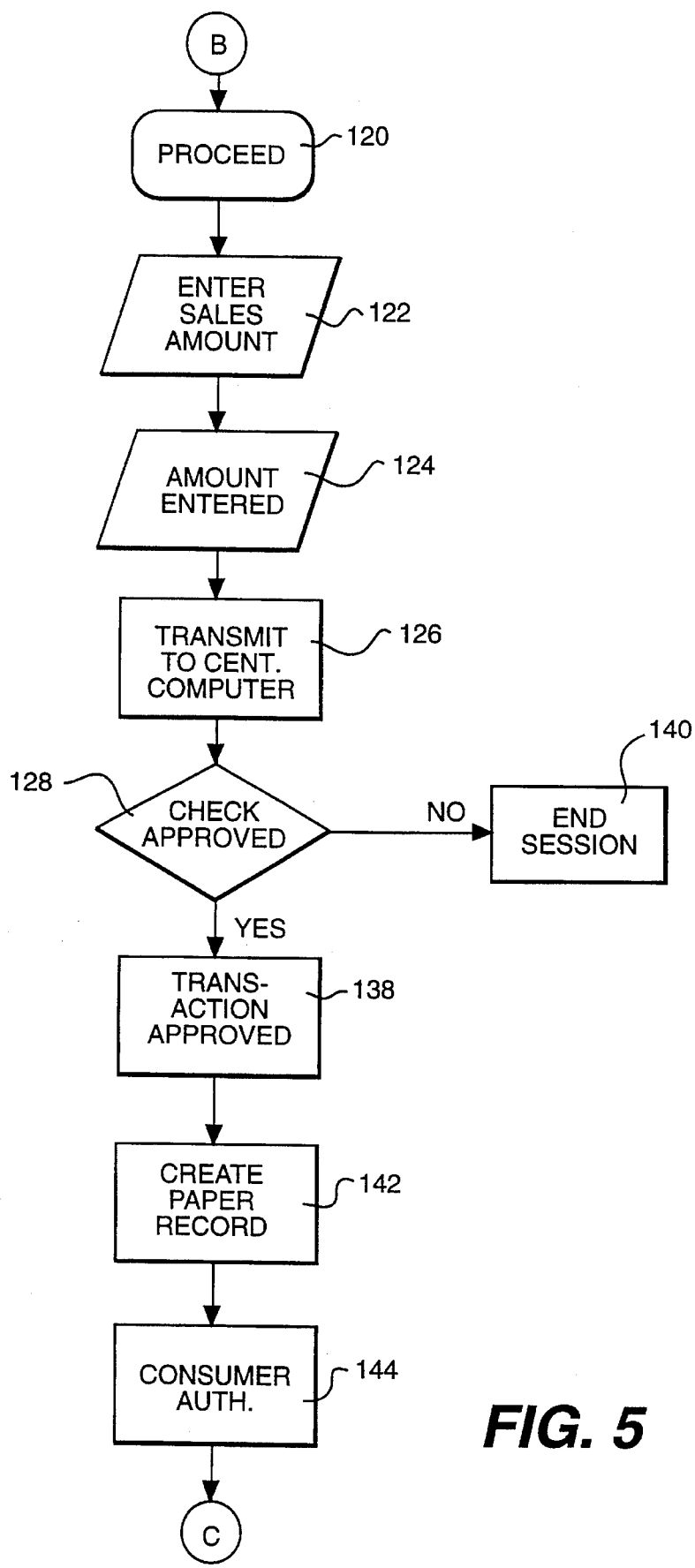

Referring to FIG. 5, if the verification process proceeds the terminal next prompts the system subscriber to enter the amount of the sale 122. The subscriber enters the amount of the sale 124 and the terminal thereafter transmits an inquiry to the host data base for verification 126.

The check approval process next takes place 128. If the check is not approved by the central computer the terminal displays a message declining the transaction 140. Thereafter a printer record of the declined transaction is made for purposes of the system subscriber 142 to comply with the Fair Credit Reporting Act and Regulation E of the Board of Governors of the Federal Reserve System.

If the check is approved the terminal displays a message noting the approval 138 and the specimen check is returned to the consumer. The printer further makes a paper record of the transaction 142 and the consumer places any required information on the paper receipt and signs the receipt authorizing the transaction 144.

Figure 7:
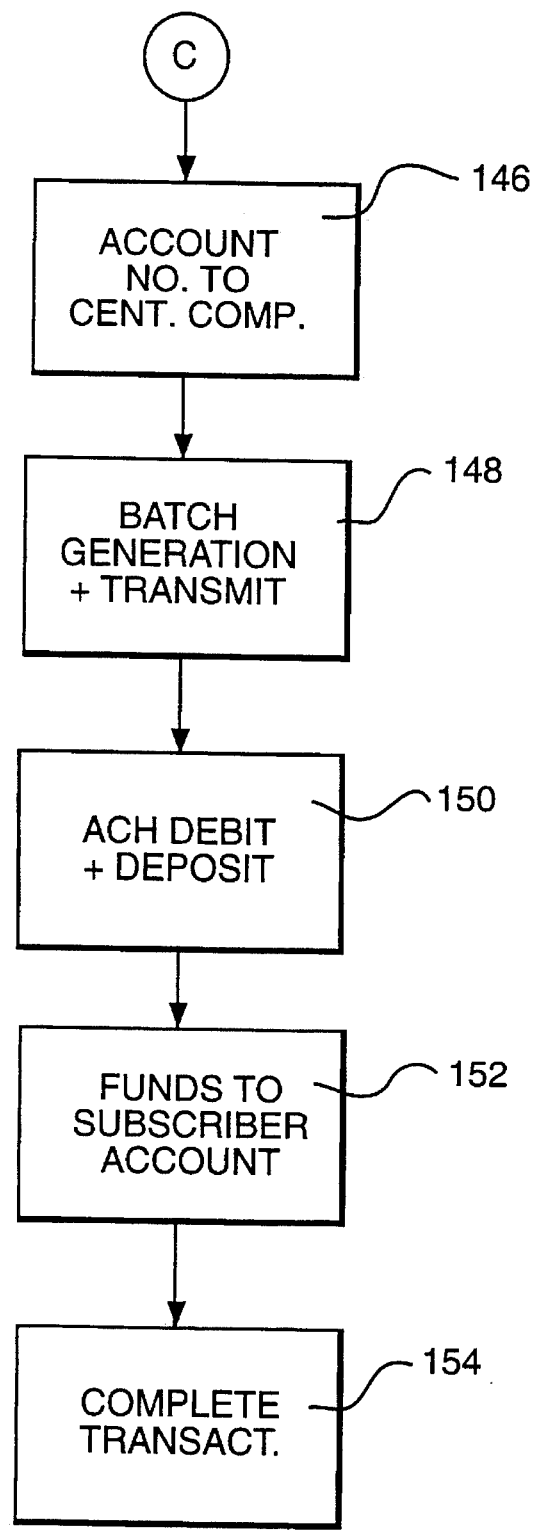

Referring to FIG. 7, the process description continues. Once the transaction is approved the central computer captures the MICR information and the sale amount and stores that information 146. The central computer subsequently generates a batch message regarding all transaction events for the prior period and transmits all the transaction event information for the day into the ACH network 148.

During the ACH process each checkwriter's account is debited for the exact purchase amount and such an amount is deposited into a system subscriber designated account 150. Thereafter, collected funds for a total day's events are deposited into a subscriber's account 152. The transaction is then complete 154.

How to Use

The present invention will require the establishment and maintenance of three interconnected but separate data files for the purpose of performing access searches. Each data file will be accessible by dial-up procedures operating, in most instances, under "Split Dial" format from a point-of-sale ("POS") terminal device or electronic cash register installed for the primary purpose of bankcard and/or bank draft authorizations. The terminal prompts an operator/user to process one of three optional inquiry types. Any one or all of three primary functions are capable of being performed at a single point-of-sale terminal within the control of the system subscriber. The inquiry types and data base format responses are as follows:

Card Authorization—Having depressed the assigned Split Dial key and thereafter being prompted, the system subscriber "slides" an encoded magnetic stripped transaction card through the point-of-sale terminal and enters the "Sale Amount" requested for authorization. Thereupon, the terminal's dial-up capabilities direct the inquiry to the central computer for authorization against "POSITIVE" file of current cardholders whose accounts were listed in "good standing". Inquiries where such a "Match" are found cause an "Approved" return message from the data file to the inquiring POS terminal. Conversely, a "No-Match" to inquiry would result in a "Declined" notice to the POS terminal. An uploading mode of the present invention causes forwarding of daily status notifications to the central data files activating new cardholder accounts in the "POSITIVE" cardholder file or submitting corrective entries to delete delinquent or terminated accounts.

Check Authorization—Having depressed the assigned Split Dial key and thereafter being prompted, the system subscriber manually enters account numbers from a personal or business check or, where fully automated, enters a specimen check through a MICR Check Reader device interfaced with the terminal, whereupon the terminal's screen would display the check's numbers, and hence the account number, for verification. Thereafter, the operator would enter the "Sale Amount" requested for authorization. The terminal's dial-up capabilities then direct the inquiry to the computer data file center for authorization first against the "POSITIVE" file of "prenoted" bank/checking account numbers whose accounts were listed in "good standing". A successful "Match" to an inquiry would result in an "Approved" notice from the data file to the inquiring terminal. A "No-Match" to inquiry would not, however, immediately result in a "Declined" response. Each inquiry preliminarily resulting in a No-Match would be instantly forwarded/"rolled" to the third data file preceding any return notice to the inquiring terminal. This third file is anticipated to be the Shared Check Authorization Network ("SCAN") a negative data file data base maintained in the system computer data file center. Referrals to SCAN or any other positive or negative data files, enable potential acceptance of Transaction Events involving consumers "Unknown" to the invention's proprietary, "POSITIVE" files. A "Match" on the SCAN "NEGATIVE" file would result in a "Declined" notice; a "No-Match" would conversely send notification to the inquiring POS terminal of an "Approved" event. Of significant importance, the bank/checking account information for each such "Unknown" consumer's transaction would, subsequent to a SCAN "Approved" notice, be posted to the invention's "POSITIVE" file and prenoted through the ACH ("Automated Clearing House") for future Transaction Events. The invention, presumedly in an automated mode, is capable of uploading daily corrections to the POSITIVE data file including notices of new accounts approved through SCAN (trademark) and deletions where settlement for consumer checking account events, initially approved, were subsequently dishonored. The SCAN data base is similarly uploaded with daily activity status corrections.

Check Replacement Service—Inquiries initiated as Check Replacement requests function in nearly an identical manner as that of Check Authorization. Records for such events, when culminating in "Approved" notices, are separately preserved. Check Replacement inquiries are processed first through the system's "POSITIVE" data file and, where no match is found, proceed to the SCAN data file or other data base file prior to transmitting an "Approved" or "Declined" notice to the inquiring POS terminal. A Match in the system data file indicates a consumer-user whose account was in "good standing" and would not be required to "roll" to SCAN. Check Replacement events are reported to and stored by the computer data file center under a file classification identifying the transaction as a Check Replacement Service. The total of daily, approved Transaction Events are "checkless" sales whereby the service subscribing merchant has submitted requests for electronic ACH settlement for all preauthorized consumer purchases. No commercial bank note ("Paper Check") is accepted or processed by the service subscriber. In each Transaction Event, a Consumer, at the point-of-sale, has executed an electronic access ("Off-Line Debit") authority "Sales Slip" which is automatically printed upon a terminal's receipt of an "Approved" notice.

All terminal programming and all prompt strings for MICR Check Reader interfacing are stored in the POS terminal and the computer center of the present invention controls interactions between the plurality of terminals and the central system. The following modules are present.

Programming for MICR/Terminal Interface—system subscriber locations to be activated with the present invention must possess or acquire a terminal. Those utilizing or being upgraded to terminals such as a Tranz (trademark) 330 or other terminals with interface capabilities with the check reader for all suitable point-of-sale terminals.

The preferred format for terminal operations is generated from a singular split dial key. Thereafter, the "prompt string" would proceed in a manner such as i) "Card=1"; "Check=2" requiring operator selection; then, where selecting a checking account inquiry ii) the operator would respond to a secondary prompt of "Auth=1"; "Replace=2". These entry selections precede the magnetic stripe "reading" of a card/submittal or a check through the MICR (Account Identification), the entry of the requested sale amount, and the terminal's dial-up for authorization against the computer data file center.

The MICR interface results in the transmittal of a query for data center approval of the entire ABA/Transit and personal or corporate checking account numbers. Instances where printed checks add the individual check's number to the end of the account number can be "dropped" by Check Reader switch settings. Subsequent to a terminal's receipt of the MICR number string but prior to the operator's entry of the requested sale amount and authorization dial-up, a verification prompt "flashing" the ABA and account numbers must be displayed on the terminal's screen requiring the operator to depress "Enter" to proceed, if correct, or "Clear", if incorrect and thereby enabling the terminal operator to resubmit the specimen check through the MICR Check Reader. It is important to note that account information may be entered manually as well at the point of sale with the other financial advantages of the present invention still in effect.

The computer data file center receives and processes Transaction Event authorization requests utilizing the entire MICR string for accurate, error-free identification of both the consumer bank and a specific checking or depository account to participate in a sale. ACH settlement criteria mandate exact recall for the bank and checking account numbers to properly complete any debit request. This invention conforms to each and every requirement of the ACH transaction regulations.

Each Transaction Event is completed with the logging printer generation of a Transaction Event ("Sales") Slip for each "Approved" authorization inquiry processed (FIG. 8). Alternatively, a manually created transaction event slip can also be prepared (FIG. 9). Each such Transaction Event Slip must be exacting in its retention of account numbers and the sale amount enabling both the consumer and system subscriber to be provided "hard copy" receipts of the event. Also included would be a clear printing of the transaction type; "Bank Card", "Check Authorization", or "Check Replacement". Authorization language is printed immediately preceding the consumer's signature line specifically authorizing electronic access in payment of the requested transaction sale amount.

In addition to the primary functions for POS terminal programming and MICR Check Reader interface, each Point-of-Sale terminal location is capable of generating printed summations of daily activity. These reports list and separately total each authorization/service type, whether produced as a singular report or as the result of multiple terminal "closeout" procedures.

Instances will arise with either the Bank Card or Check Replacement Service where previously authorized Transaction Events will require the operational equivalent of a bankcard "Void" or "Credit" notation. The methodology will be available for Split Dial messages to the computer data file center of a post-authorization "Error" or "Transaction Cancellation" notice. The "Cancel" procedure is instituted by depressing for example the "3" key (i.e. "Cancel=3"). By so doing, the system subscriber may cancel a previously approved and logged event. This Transaction Event which was recorded on the data files and reported on the service subscriber's daily Activity Summation Report, thereafter carries an offsetting, "Flagged" cancellation notice Summary A flexible purchase transaction system is described which precisely fits within existing ACH procedures for checking account events for processing of pre-authorized electronic debits as a replacement for commercial bank drafts (paper checks). The main advantage to the proposed invention is the fact that a truly paperless transaction may occur. Departures from the proposed system especially with respect to the Point-of-Sale terminals will be apparent to those skilled in the art without departing from the spirit of the invention as described.

We claim:

1. A checkwriting point of sale system comprising:

a point of sale terminal adapted to receive consumer bank account information from any bank check;

a central computer system;

first communications means integral to said point of sale terminal for electronically communicating with the central computer system;

memory means integral to said point of sale terminal for temporarily storing the consumer bank account information;

the central computer system having second communication means for receiving information from a plurality of said point of sale terminals;

the central computer system second communication means enabling said central computer system to communicate with external databases for performing a consumer bank account status search and further enabling automated clearing house communication for transferring funds without using the bank check as a negotiable instrument.

2. The checkwriting point of sale system according to claim 1 wherein said point of sale terminal further includes means for reading magnetic ink character recognition numbers appearing on a consumer check for the sole purpose of identifying and reading the consumer bank account information.

3. The checkwriting point of sale system according to claim 1 wherein said point of sale terminal further comprises an alphanumeric display means for receiving said consumer bank account information from the memory means and for displaying the consumer bank account information.

4. The checkwriting point of sale system according to claim 1 further comprising a printer means for receiving information from the memory means of the point of sale terminal and for generating a transaction event sale slip.

5. The checkwriting point of sale system according to claim 1 further comprising a resident third party database wherein consumer banking account status information is stored, the consumer banking account status information being used for verification of consumer banking account status.

6. The checkwriting point of sale system according to claim 1 wherein the central computer system further comprises a system subscriber database, the system subscriber database comprising information regarding merchants and service providers that are authorized to use the checkwriting point of sale system.

7. The checkwriting point of sale system according to claim 6 wherein the central computer system further comprises a database comprising information regarding consumers whose consumer banking account status is not verified as bad.

8. A checkwriting point of sale process comprising:

a) presenting any bank check specimen to a point of sale terminal located at a merchant or service provider, b) reading the magnetic ink character recognition number information on the check for the sole purpose of obtaining consumer bank account information, without using the check as a negotiable instrument, c) storing the consumer bank account information obtained from the check and verifying that account numbers were accurately read at the point of sale terminal, d) providing transaction event information to the point of sale terminal, e) transmitting the transaction event information and consumer bank account information to a central computer system, f) storing the transaction event information and consumer banking account information, and g) subsequently transmitting the transaction event information to a bank for subsequent automated clearing house operations.

9. A checkwriting point of sale system comprising:

a point of sale terminal adapted to receive consumer bank account information;

a central computer system;

first communications means integral to said point of sale terminal for electronically communicating with the central computer system; and memory means integral to said point of sale terminal for temporarily storing the consumer bank account information;

the point of sale terminal comprising reading means for reading magnetic ink character recognition numbers on any consumer bank check for the sole purpose of eliciting consumer bank account information;

the central computer system having second communication means for receiving information from a plurality of said point of sale terminals;

the central computer system second communication means enabling said central computer system to communicate with external databases for performing a consumer bank account status search and further enabling automated clearing house communication for transferring funds without using a bank check as a negotiable instrument.

10. The checkwriting point of sale system according to claim 9 further comprising a printer means for receiving information from the memory means of the point of sale terminal and for generating a transaction event sale slip.

11. The checkwriting point of sale system according to claim 9 further comprising a resident third party database wherein consumer banking account status information is stored, the consumer banking account status information being used for verification of consumer banking account status.

12. The checkwriting point of sale system according to claim 9 wherein the central computer system further comprises a system subscriber database, the system subscriber database comprising information regarding merchants and service providers that are authorized to use the checkwriting point of sale system.

13. The checkwriting point of sale system according to claim 4, wherein the sales slip includes means for execution by the consumer for proof of bank account access authorization.

14. The checkwriting point of sale system of claim 1, wherein the point of sale terminal further comprises means for automatically logging a point of sale terminal location and transaction date, time, and sales amount.

15. The checkwriting point of sale process of claim 8, further comprising:
 a) verifying the status of the consumer bank account,
 b) verifying the consumer bank account status of the consumer via a query to a third party database if the consumer bank account is verified as bad, and
 c) sending an approval message to the point of sale terminal if the consumer's banking account status is approved for the transaction.

16. The checkwriting point of sale process of claim 8, further comprising:
 (A) printing a transaction event sales slip following the sending of an approval message; and
 (B) executing of the sales slip by the consumer as proof of bank account access authorization.

17. The checkwriting point of sale process of claim 15, further comprising:
 (A) printing a transaction event sales slip following the sending of an approval message; and
 (B) executing of the sales slip by the consumer as proof of bank account access authorization.

18. The checkwriting point of sale process of claim 8, further comprising automatically logging point of sale terminal location information and transaction date, time, and sales amount information into the point of sale terminal.

19. The checkwriting point of sale system according to claim 10, wherein the sales slip includes means for execution by the consumer of proof of bank account access authorization.

20. The checkwriting point of sale system of claim 9, wherein the point of sale terminal further comprises means for automatically logging a point of sale terminal location and transaction date, time, and sales amount.

* * * * *